United States Patent
Gosby

(10) Patent No.: US 7,321,880 B2
(45) Date of Patent: Jan. 22, 2008

(54) WEB SERVICES ACCESS TO CLASSIFICATION ENGINES

(75) Inventor: Desiree D. G. Gosby, Allston, MA (US)

(73) Assignee: International Business Machines Corporation, Armonk, NY (US)

(*) Notice: Subject to any disclaimer, the term of this patent is extended or adjusted under 35 U.S.C. 154(b) by 397 days.

(21) Appl. No.: 10/613,560

(22) Filed: Jul. 2, 2003

(65) Prior Publication Data

US 2005/0005232 A1 Jan. 6, 2005

(51) Int. Cl.
*G06F 7/00* (2006.01)
*G06F 17/30* (2006.01)

(52) U.S. Cl. ................... 706/20; 707/3; 707/6
(58) Field of Classification Search ............... 706/20
See application file for complete search history.

(56) References Cited

U.S. PATENT DOCUMENTS

| 5,802,508 | A | 9/1998 | Morgenstern |
| 5,987,457 | A | 11/1999 | Ballard |
| 6,463,430 | B1 | 10/2002 | Brady et al. |
| 6,519,631 | B1* | 2/2003 | Rosenschein et al. ....... 709/217 |
| 2002/0016800 | A1 | 2/2002 | Spivak et al. |
| 2002/0078044 | A1 | 6/2002 | Song et al. |

FOREIGN PATENT DOCUMENTS

| JP | 11120183 | 4/1999 |
| JP | 10074250 | 8/1999 |
| JP | 2001344246 | 12/2001 |
| JP | 2002140356 | 5/2002 |
| WO | 00033215 | 6/2000 |

OTHER PUBLICATIONS

Qusay H. Mahmoud, Registration and Discovery of Web Services Using JAXR with XML Registries such as UDDI and ebXML, 2002, Sun Developer Network (SDN).*
IBM Technical Disclosure Bulletin, Method of Keyword Categorization, vol. 40, No. 10, Oct. 1997, 2 pages.
IBM Technical Disclosure Bulletin, Intelligent Searching of Dynamic Databases, vol. 41, No. 01, Jan. 1998, pp. 647-650.
IBM Technical Disclosure Bulletin, Personalized Information Navigator, vol. 39, No. 08, Aug. 1996, pp. 57-60.

* cited by examiner

*Primary Examiner*—Anthony Knight
*Assistant Examiner*—Nathan H. Brown, Jr.
(74) *Attorney, Agent, or Firm*—Schmeiser, Olsen & Watts; Daniel McLoughlin; John R. Pivnichny

(57) ABSTRACT

A method and system for document analysis and retrieval. A remote host in a first computing system transmits a first portion and at least one additional portion of a document to a web service host in a second computing system. The web service host reconstructs the entire document from the received first portion and at the least one additional portion. After reconstructing the entire document, the web service host implements at least one of extracting, generating, and determining steps. The extracting step extracts text from the entire document to configure the text in a text format. The generating step generates document keys associated with the text from analysis of the text in the text format. The determining step determines from given categories of a document taxonomy, a set of closet categories to the document based on comparing the category keys of the given categories with the document keys.

20 Claims, 13 Drawing Sheets

WEB SERVICES ACCESS TO CLASSIFICATION ENGINES

BACKGROUND OF THE INVENTION

1. Technical Field

The present invention relates generally to a method and system for document analysis and retrieval, and more specifically to a method and system for determining categories and document links relating to a given document.

2. Related Art

Transmitting a given document for analysis, and subsequently analyzing the given document to determine categories and document links relating to the given document, may be slow, inefficient, and difficult. Thus, there is a need for a speedy, efficient, and simple method and system for transmitting and analyzing documents to determine categories and document links relating to the given document.

SUMMARY OF THE INVENTION

In first embodiments, the present invention provides a method for document analysis and retrieval, comprising the following steps performed in the order recited:

transmitting, by a remote host in a first computing system to a web service host in a second computing system, a first portion of a document; and sequentially transmitting, by the remote host to the web service host, at least one additional portion of the document, wherein the first portion and the at least one additional portion collectively comprise the entire document, wherein the entire document is adapted to be reconstructed and subsequently processed via processing said entire document by the web service host, said processing comprising at least one of:

extracting text from said entire document to configure said text in a text format, if said entire document received by said web service host comprises said text in a non-text format; determine generating document keys associated with said text from analysis of said text in said text format, if said entire document received by said web service host comprises said text in said text format, or if said web service host has previously performed said extracting such that said text in said text format is available to said web service host; and determining, from given categories of a document taxonomy, a set of closet categories to the document based on a comparison between the document keys and category keys of the given categories, if said entire document received by said web service host comprises said document keys, or if said web service host has previously performed said generating such that said document keys are available to said web service host.

In second embodiments, the present invention provides a first computing system that includes a remote host, wherein the remote host is remote relative to a web service host in a second computing system, and wherein the remote host is adapted to:

transmit a first portion of a document to the web service host; and sequentially transmit at least one additional portion of the document to the web service host, wherein the first portion and the at least one additional portion collectively comprise the entire document, wherein the entire document is adapted to be reconstructed and subsequently processed via processing said entire document by the web service host, said processing comprising at least one of:

extracting text from said entire document to configure said text in a text format, if said entire document received by said web service host comprises said text in a non-text format; determine generating document keys associated with said text from analysis of said text in said text format, if said entire document received by said web service host comprises said text in said text format, or if said web service host has previously performed said extracting such that said text in said text format is available to said web service host; and determining, from given categories of a document taxonomy, a set of closet categories to the document based on a comparison between the document keys and category keys of the given categories, if said entire document received by said web service host comprises said document keys, or if said web service host has previously performed said generating such that said document keys are available to said web service host.

In third embodiments, the present invention provides a method for document analysis and retrieval, comprising the following steps performed in the order recited:

receiving, by a web service host in a second computing system from a remote host in a first computing system, a first portion of a document;

sequentially receiving, by the web service host from the remote host, at least one additional portion of the document, wherein the first portion and the at least one additional portion collectively comprise the entire document;

reconstructing the entire document from the first portion and the at least one additional portion; and processing the entire document by the web service host, wherein said processing comprises at least one of:

extracting text from said entire document to configure said text in a text format, if said entire document received by said web service host comprises said text in a non-text format;

generating document keys associated with said text from analysis of said text in said text format, if said entire document received by said web service host comprises said text in said text format, or if said web service host has previously performed said extracting such that said text in said text format is available to said web service host; and determining, from given categories of a document taxonomy, a set of closest categories to the document, if said entire document received by said web service host comprises said document keys, or if said web service host has previously performed said generating such that said document keys are available to said web service host.

In fourth embodiments, the present invention provides a system for document analysis and retrieval, comprising a second computing system that includes a web service host, wherein the web service host is remote relative to a remote host in a first computing system, and wherein the web service host is adapted to:

receive a first portion of a document from the remote host;

sequentially receive at least one additional portion of the document from the remote host, wherein the first portion and the at least one additional portion collectively comprise the entire document;

reconstruct the entire document from the first portion and the at least one additional portion; and implement processing the entire document, said processing comprising at least one of:

extracting text from said entire document to configure said text in a text format, if said entire document received by said web service host comprises said text in a non-text format;

generating document keys associated with said text from analysis of said text in said text format, if said entire document received by said web service host comprises said text in said text format, or if said web service host has previously performed said extracting such that said text in said text format is available to said web service host; and determining, from given categories of a document taxonomy, a set of closet categories to the document, if said entire document received by said web service host comprises said document keys, or if said web service host has previously performed said generating such that said document keys are available to said web service host.

The present invention provides a speedy, efficient, and simple method and system for transmitting and analyzing documents to determine categories and document links relating to the given document.

DETAILED DESCRIPTION OF THE INVENTION

Figure 1:
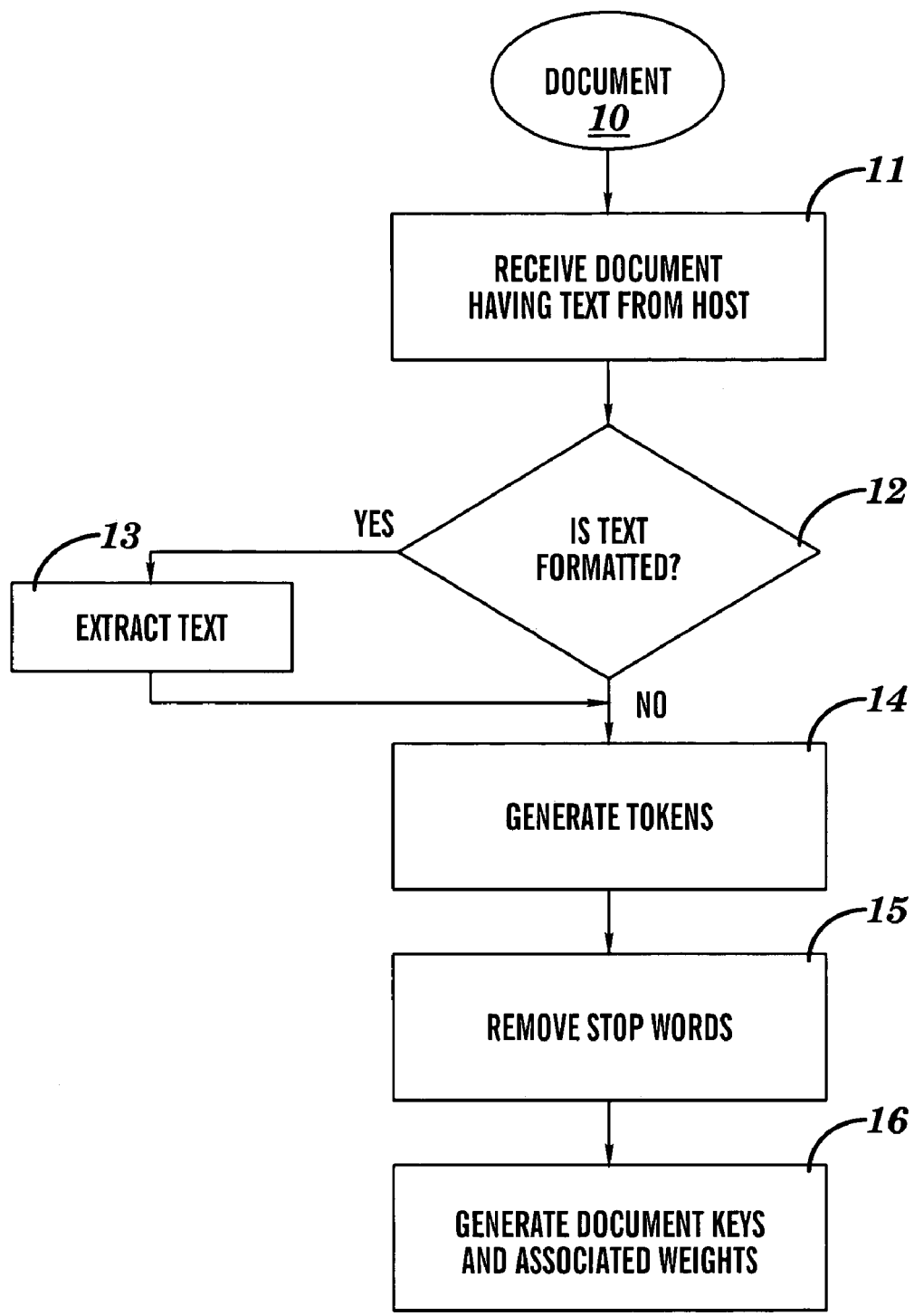
FIG. 1 is a flow chart for generating document keys of a given document, in accordance with embodiments of the present invention.

FIG. 1 is a flow chart for generating document keys of a document 10, in accordance with embodiments of the present invention. The document 10 includes text and the document keys are the generic roots of words and phrases appearing in said text of the document 10. The document 10 is any text document in any application environment such as a document in any commercial word processor environment (e.g., Microsoft Word, WordPerfect®, etc.), a web page accessed through a web browser, etc. The application environment is called a "host" or a "host application".

In step 11, the document 10 is received from the host by a computing system that will subsequently process the text in steps 12-16. Step 12 determines whether the text in the document 10 is formatted (i.e., whether the text appears in a non-text format such as in a format that is specific to the host). If the text is not formatted, then step 14 is next executed. If the text is formatted, then step 13 extracts the text such that the text is separated from its non-text format, and step 14 is next executed. Extracting the text leaves format parameters behind. For example, in a HyperText Markup Language (HTML) document, extracting the text leaves the HTML tags behind. There may be some generic formatting retained (e.g., paragraph breaks), but formatting specific to the host application is removed. The output of step 13 is a text file. The text extraction may be performed by any method known to one of ordinary skill in the art. Additionally, there are software products on the market (e.g., Verify Key View filter) that may be utilized to perform the text extraction.

Step 14 tokenizes the text (i.e., generates tokens from the text). A token is the text that appears between delimiters (blanks, periods, commas, etc.). The output of said tokenizing is a list of tokens such as, inter alia, in an array or vector of tokens.

Step 15 removes stop words from the tokens. Stop words are generic words that have no substantive meaning in relation to the subject content in the document. Examples of stop words include "a", "the", "he", "she". Stop words may be context-dependent (e.g., stop words for E-mail and for instant message chat may be different), since a word may have a meaning in one context but not in another context. Although FIG. 1 shows step 15 as being executed after step 14, the stop words may alternatively be removed from the text prior to execution of the tokenizing of step 14.

Step 16 generates, by stemming, the document keys of the document 10 from the tokens. Stemming is a process that determines the normal form or root of each word or phrase in each token. For example, "changing" has the root "change". Alternative expressions for root words and root phrases are "keywords" and "keyphrases", respectively. Stemming algorithms are known in the art (e.g., the Porter Stemming Algorithm), and any such known stemming algorithm may be used to implement step 16. The document keys generated by step 16 are said roots determined by said stemming. A document key is defined herein as a root word (i.e., keyword) or root phrase (i.e., keyphrase) in the document.

Step 16 also generates weights associated with said document keys on a on-to-one basis. Generating the weights may comprise determining the frequency count of each document key in the document. The frequency count of a document key is the number of appearances of the document key in the document. The weight may be a linear function of the frequency count. For example, the weight may be numerically equal to, or proportional to, the frequency count. Alternatively, the weight may be a nonlinear function of the frequency count. For example, the weight may be proportional to the frequency count raised to a power P wherein P>1 (e.g., P=2). The weights may also take into account the location of the document key in the document. For example, words or phrases appearing at the beginning of the document, or in the document title, or in the document abstract, etc. may have a higher weight than words or phrases located elsewhere in the document. The importance of the location of the document key in the document is context sensitive, since relevance of different locations (e.g., title, abstract, etc.) may depends on the document itself, on the type of document, on the subject matter of the document, etc.

Figure 2:
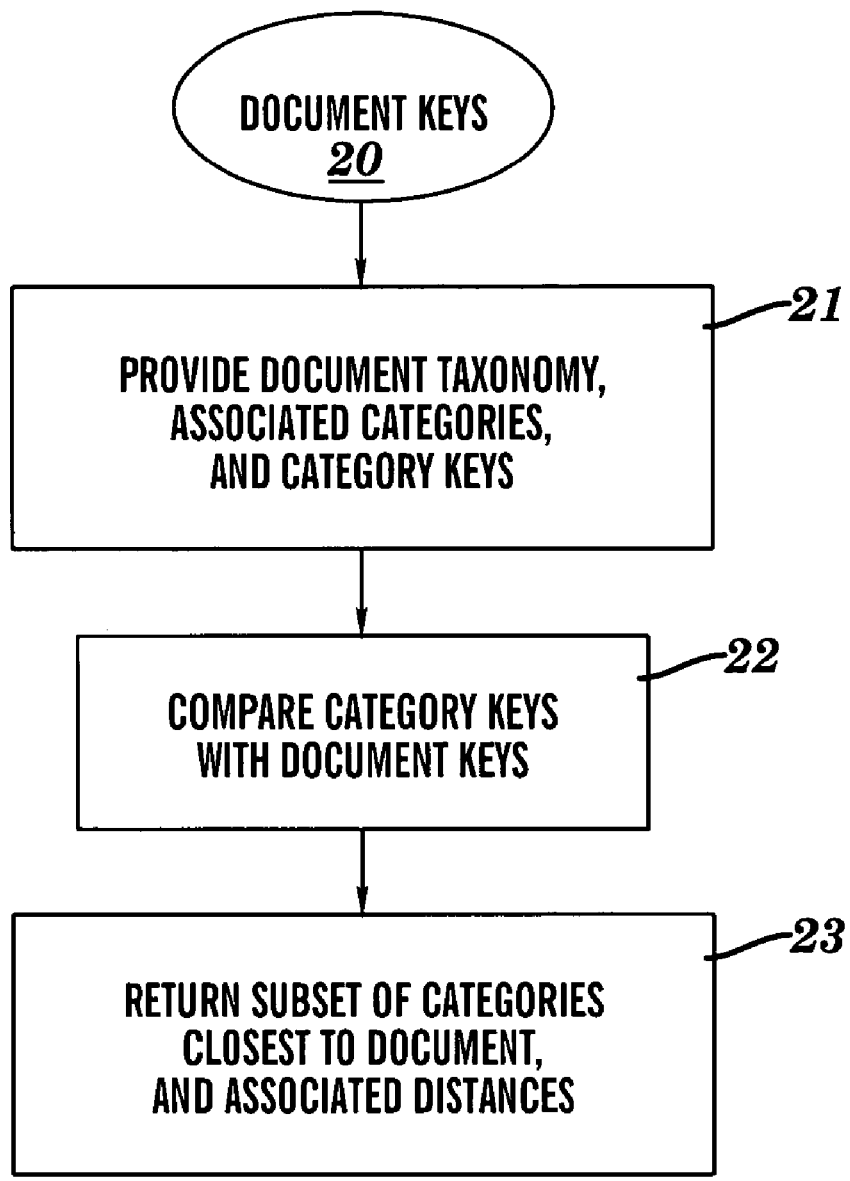
FIG. 2 is a flow chart for determining which categories of a given taxonomy are at a close distance to the document keys of FIG. 1, in accordance with embodiments of the present invention.

FIG. 2 is a flow chart for determining which categories of a given taxonomy are at a close distance to the document keys generated in step 16 of FIG. 1, in accordance with embodiments of the present invention. In FIG. 2, the document keys 20 are the document keys generated in step 16 of FIG. 1. Step 21 provides as input a document taxonomy and categories of the document taxonomy, as well as category keys of each said category. A document taxonomy is a based on a subject matter classification in conjunction with a collection of stored documents, wherein each taxonomy is a general subject area. Each taxonomy comprises categories. Each category comprises both category keys and category weights associated with the category keys on a one-to-one basis. For example, the taxonomy may be "houses", and the categories of "houses" may be "house style" and house color". The "house style" category may have category keys of "colonial", "ranch", and "split level". The "house color" category" may have category keys of "white", "blue", and "green". The category keys are analogous to the document keys discussed supra. Accordingly, the category keys may comprise root words (i.e., keywords) and root phrases (i.e., keyphrases).

Step 21 also generates weights associated with said category keys on a on-to-one basis. Generating the weights may comprise determining the frequency count of each category key in the stored documents associated with the taxonomy. The frequency count of a category key is the number of appearances of the category key in the stored documents. The weight may be a linear function of the frequency count. For example, the weight may be numerically equal to, or proportional to, the frequency count. Alternatively, the weight may be a non-linear function of the frequency count. For example, the weight may be proportional to the frequency count raised to a power P wherein P>1 (e.g., P32 2). The weights may also take into account the location of the category key in the stored documents.

Step 22 compares the category keys of each category with the document keys 20 to make a determination of a distance D between the document 10 (or equivalently, the document keys 20) and each category as a measure of how close the document 10 (or equivalently, the document keys 20) is to each category. The distance between the document 10 and each category may be computed as a dot product of a vector of the document keys 20 and a vector of the category keys for each category as follows. Let a reference dictionary for the taxonomy encompass all categories of the taxonomy, and all said categories of the taxonomy collectively comprise N category keys, wherein N is a positive integer. Let $\underline{V}_{DOC}$ represent a vector of order N of the document keys 20 such that each element of $\underline{V}_{DOC}$ is associated with a unique category key of the reference dictionary, and each element of $\underline{V}_{DOC}$ contains 1 if there exists a document key of the document keys 20 that matches the category key associated with the element of $\underline{V}_{DOC}$, or contains 0 otherwise. Let $\underline{V}_{CAT}(I)$ represent a vector of order N of the $I^{th}$ category of the taxonomy such that each element of $\underline{V}_{CAT}(I)$ is associated with said unique category key of the reference dictionary, and each element of $\underline{V}_{CAT}(I)$ contains 1 if there exists a category key of the $I^{th}$ category that matches the category key associated with the element of $\underline{V}_{CAT}(I)$, or contains 0 otherwise. The distance D(I) between the document 10 (or equivalently, the document keys 20) and the $I^{th}$ category of the taxonomy may be expressed as the dot product of $\underline{V}_{DOC}$ and $\underline{V}_{CAT}(I)$; i.e., $D=\underline{V}_{DOC} \cdot \underline{V}_{CAT}(I)$. Note that the dot product of two vectors is the summation over the product of corresponding elements of the two vectors, as is conventionally understood in the art of mathematics of vectors. As an example, if N=5, $\underline{V}_{DOC}=[1, 1, 1, 0, 1]$, and $\underline{V}_{CAT}(I)=[1, 0, 1, 1, 1]$, then D(I)=3.

The preceding distance D was computed independent of the document weights associated with the document keys 20 and independent of the category weights associated with the category keys provided for each category in step 21. Recalling that a one (1) in $\underline{V}_{DOC}$ denotes the existence of a document key that matches a category key of the taxonomy dictionary, $\underline{V}_{DOC}$ could be replaced by the weighted vector $W_{DOC}$ wherein the ones (1) in $\underline{V}_{DOC}$ are replaced by their associated document weights. Recalling that a one (1) in $\underline{V}_{CAT}(I)$ denotes the existence of a category key of the $I^{th}$ category that matches a category key of the taxonomy dictionary, $\underline{V}_{CAT}(I)$ could be replaced by the weighted vector $\underline{W}_{CAT}(I)$ wherein the ones (1) in $\underline{V}_{CAT}(I)$ are replaced by their associated category weights. Then the distance D could be represented by various alternative dot products, including $\underline{W}_{DOC} \cdot \underline{V}_{CAT}(I)$, $\underline{V}_{DOC} \cdot \underline{W}_{CAT}(I)$, a As an example, consider the "houses" taxonomy, discussed supra. For this example, let N=6 and the pertinent vectors have elements representing the sequentially ordered 6 category keys of the taxonomy "houses" dictionary: "colonial", "ranch", and "split level", "white", "blue", and "green". Assume that the document keys 20 include document keys of only "ranch", "white", and "blue" with associated weights 2, 3, and 1, respectively. Category (1) of taxonomy "houses" are assumed to have category keys of "colonial", "ranch", and "split level" with associated category weights of 1, 2, and 3, respectively, in this example. Category (2) of taxonomy "houses" are assumed to have category keys of "white", "blue", and "green"with associated category weights of 2, 2, and 1, respectively, in this example. Then, the pertinent vectors are:

$\underline{V}_{DOC}=[0, 1, 0, 1, 1, 0]$
$\underline{W}_{DOC}=[0, 2, 0, 3, 1, 0]$
$\underline{V}_{CAT}(1)=[1, 1, 1, 0, 0, 0]$
$\underline{W}_{CAT}(1)=[1, 2, 3, 0, 0, 0]$
$\underline{V}_{CAT}(2)=[0, 0, 0, 1, 1, 1]$
$\underline{W}_{CAT}(2)=[0, 0, 0, 2, 2, 1]$ The various dot products for this example are:
$\underline{V}_{DOC} \cdot \underline{V}_{CAT}(1)=1$
$\underline{V}_{DOC} \cdot \underline{W}_{CAT}(1)=2$ $\underline{W}_{DOC} \cdot \underline{V}_{CAT}(1)=2$
$\underline{W}_{DOC} \cdot \underline{W}_{CAT}(1)=4$
$\underline{V}_{DOC} \cdot \underline{V}_{CAT}(2)=2$
$\underline{V}_{DOC} \cdot \underline{W}_{CAT}(2)=4$
$\underline{W}_{DOC} \cdot \underline{V}_{CAT}(2)=4$
$\underline{W}_{DOC} \cdot \underline{W}_{CAT}(2)=8$ In this example, if the weights are neglected then $D(1)= \underline{V}_{DOC} \cdot \underline{V}_{CAT}(1)=1$ and $D \underline{V}_{CAT}(2)=2$, so that the document 10 is closer to category 1 than to category 2 by a factor of 2.

Step 23 returns a subset of the categories to the host that provided the document 10, such that the returned subset includes those categories that are closest to the document 10 along with their associated distances from the document 10. The number of such categories returned may be based on any criteria, such as a predetermined number of categories, a predetermined percentage of the categories, categories having a distance below a predetermined threshold distance, etc. The returned categories may be returned in any form such as a file of categories, a printout of the categories, a display of the categories such that a user can use the categories to link to documents related to the categories, etc.

Figure 3:
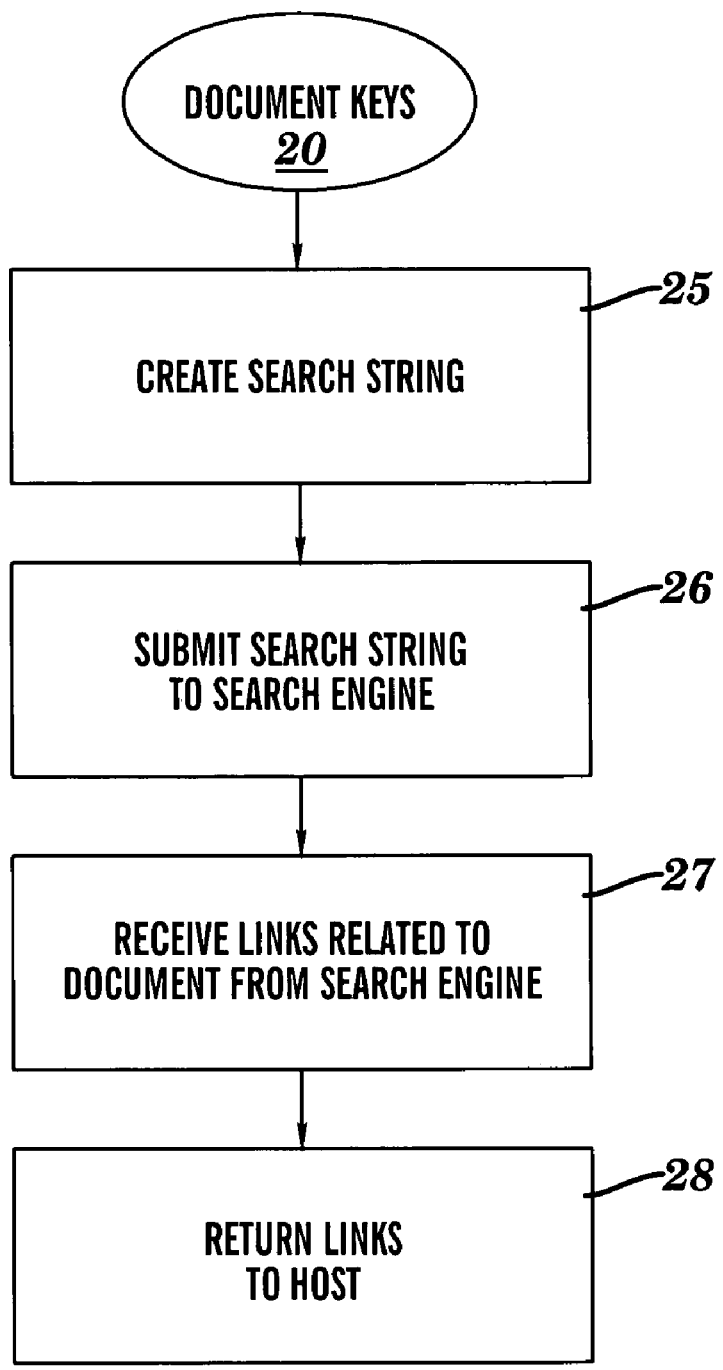
FIG. 3 is a flow chart for determining links to documents based on the document keys of FIG. 1, in accordance with embodiments of the present invention.

FIG. 3 is a flow chart for determining links to documents based on the document keys generated in step 16 of FIG. 1, in accordance with embodiments of the present invention. In FIG. 3, the document keys 20 are the document keys generated in step 16 of FIG. 1. Step 25 creates a search string. The search string comprises a logical function of a subset of the document keys 20. The subset may include all of the document keys or less than all of the document keys. The subset may be determined by any criteria, including criteria that depend on the weights associated with the document keys. The number of such document keys in the subset may be based on any criteria, such as a predetermined number of document keys, a predetermined percentage of the document keys, document keys having an associated weight above a predetermined threshold weight, etc. When the subset comprises less than all of the document keys, the specific document keys in the subset may be based on the respective weights such that the highest weighted document keys are used in the search string and the remaining document keys are not used in the search string. If the subset comprises document keys $K_1, K_2, \ldots K_M$ ($M \geq 2$), then the logical function may be, inter alia, $\{K_1 \text{ AND } K_2 \ldots \text{ AND } K_M\}$ or $\{K_1 \text{ OR } K_2, \ldots \text{ OR } K_M\}$. A default type of search string, or a default algorithm for generating the search string, may be configurable and thus subject to control by the user. The default search string may be automatically generated in accordance with the default algorithm.

Step 26 submits the search string to a search engine or to multiple search engines. Step 27 receives links to documents related to the document 10 (i.e., to the document keys 20) from the search engine or from the multiple search engines. Since the search engine or multiple search engines utilized the search string for performing the search(es), the links received from the search engine or from the multiple search engines are based on the search string. Step 28 returns the links to the host that provided the document 10. The returned links may be returned in any form such as a file of links, a printout of the links, a display of the links such that a user can use the links to link to the documents related to the document 10. Additionally, the steps of FIGS. 1-3 may be may be re-utilized by being applied to any found document previously determined from steps 25-28 to be related to the document 10. Such re-utilization of the steps of FIGS. 1-3 may be accomplished by applying steps 11-16 of FIG. 1 to said found document to generate the document keys 20 in step 16, followed by applying at least one of the following step sequences to the document keys 20 associated with said found document: the sequence of steps 21-23 in FIG. 2 and the sequence of steps 25-28 in FIG. 3.

Figure 4:
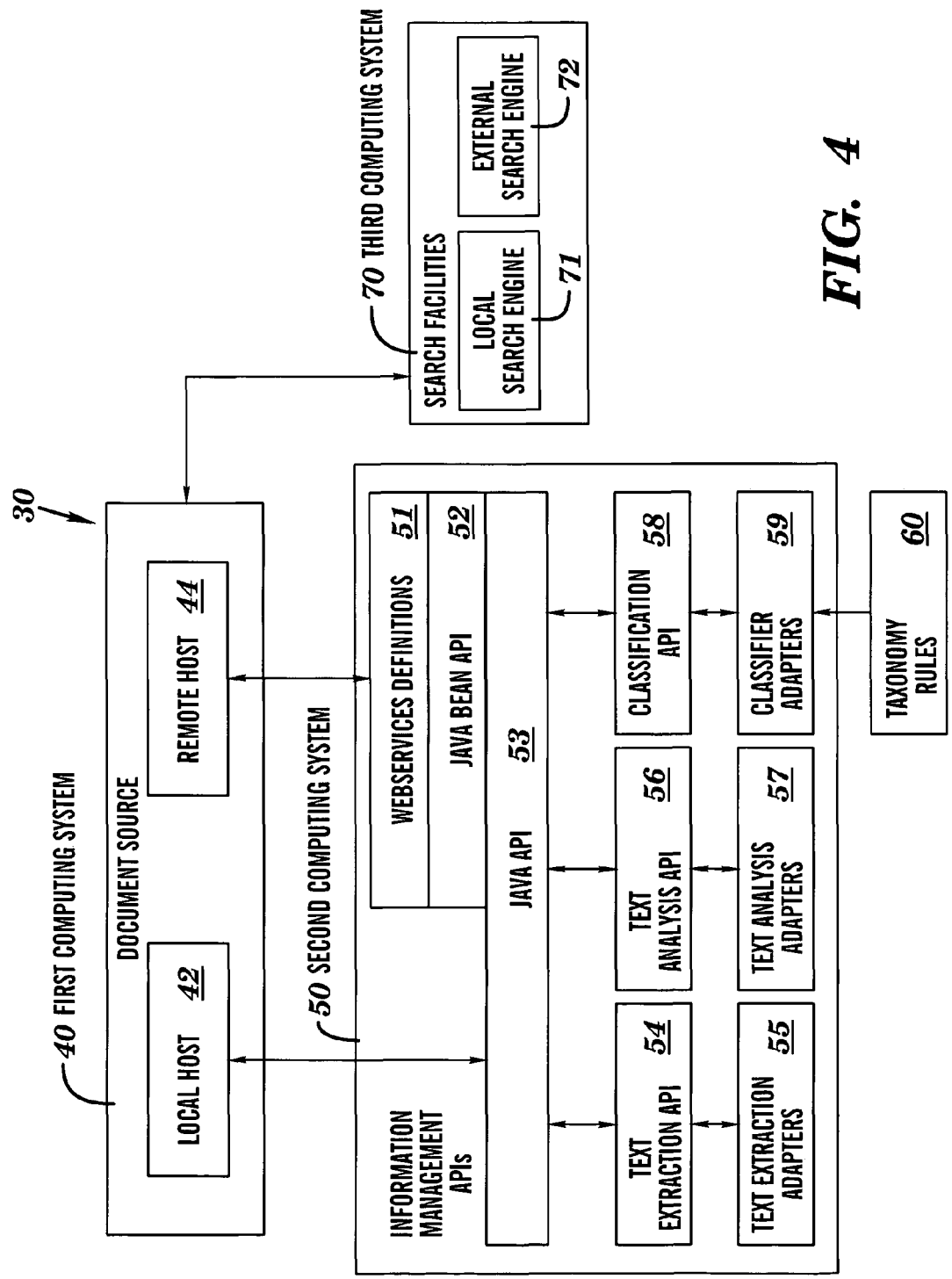
FIG. 4 depicts a system for determining categories and document links relating to the given document of FIG. 1, in accordance with embodiments of the present invention.

FIG. 4 depicts a system 30 for determining categories and document links relating to the document 10 of FIG. 1, in accordance with embodiments of the present invention: The document 10 of FIG. 1 may be a text document in any application environment such as a document in any commercial word processor environment (e.g., Microsoft Word, WordPerfect, etc.), a web page accessed through a web browser, an instant messaging application, etc. The application environment is called a "host" or a "host application". The system 30 comprises a first computing system 40, a second computing system 50, and a third computing system 70.

The first computing system 40 comprises a host which is a source of the given document (i.e., the document 10 of FIG. 1) to be processed in accordance with the present invention. In FIG. 4, the host may be a local host 42 or a remote host 44. The local host 42 is local to the second computing system 50. The remote host 44 is remote the second computing system 50 and may communicate with the second computing system 50 through any transmission means or path such, inter alia, the Internet, an Intranet, telephone lines, cable, etc. The remote host 44 may establish communication with the second computing system 50 by establishing a "session", with an associated session identification ("session id"), in accordance with communication protocols.

The second computing system 50 receives and processes the given document from the first computing system 40. The second computing system 50 comprises an Information Management Application Programming Interfaces (APIs) which encapsulate three types of services: text extraction, text analysis, and classification. The text extraction relates to step 13 of FIG. 2 and includes a text extraction API 54 interfacing a text extraction adapter 55 which is a text extraction tool. The text analysis relates to steps 14-16 of FIG. 1 and includes a text analysis API 56 interfacing a text analysis adapter 57 which is a set of text analysis tools associated with steps 14-16 of FIG. 2. The classifiers relate to steps 21-23 of FIG. 2 and includes a classification API 58 interfacing classifier adapters 59 which implement steps 21-23 of FIG. 12. The classifier adapters 59 have access to taxonomy rules 60, which may be stored in a database, file, table or tables, etc. An example of a taxonomy rule of the taxonomy rule 60 is a specification of the category keys of a category. See FIG. 2 supra and accompanying text for a discussion of category keys of a category.

A Java API 53 directly interfaces the local host 42 to said text extraction, text analysis, and classification. The Java API 53 indirectly interfaces the remote host 44 to said text extraction, text analysis, and classification, inasmuch as the Java API 53 is wrapped in a Java Bean API 52 which is wrapped in WebServices Definitions 51. Thus the WebServices Definitions 51 serves as a direct interface with the remote host 44 and allows the remote host 44 to access the text extraction, text analysis, and classification through whatever Remote Procedure Call (RPC) mechanism is defined in the WebServices Definitions 51.

The third computing system 70 comprises Search Facilities that relate to the search engine of steps 26-27 of FIG. 3. The Search Facilities of the third computing system 70 may comprise a local search engine 71 or an external search engine 72. The local search engine 71 is local to the first computing system 40 (e.g., an operating system that indexes files in a file system and has a search interface). The external search engine 72 is external to the first computing system 40 (e.g., an Internet search engine).

Although the first computing system 40, the second computing system 50, and the third computing system 70 are shown in FIG. 4 as separate computer systems, the first computing system 40 and the second computing system 50 may each be included within a first same computing system. Similarly, the first computing system 40 and the third computing system 70 may each be included within a second same computing system. Additionally, the first computing system 40, the second computing system 50, and the third computing system 70 may each be included within a third same computing system.

Figure 5:
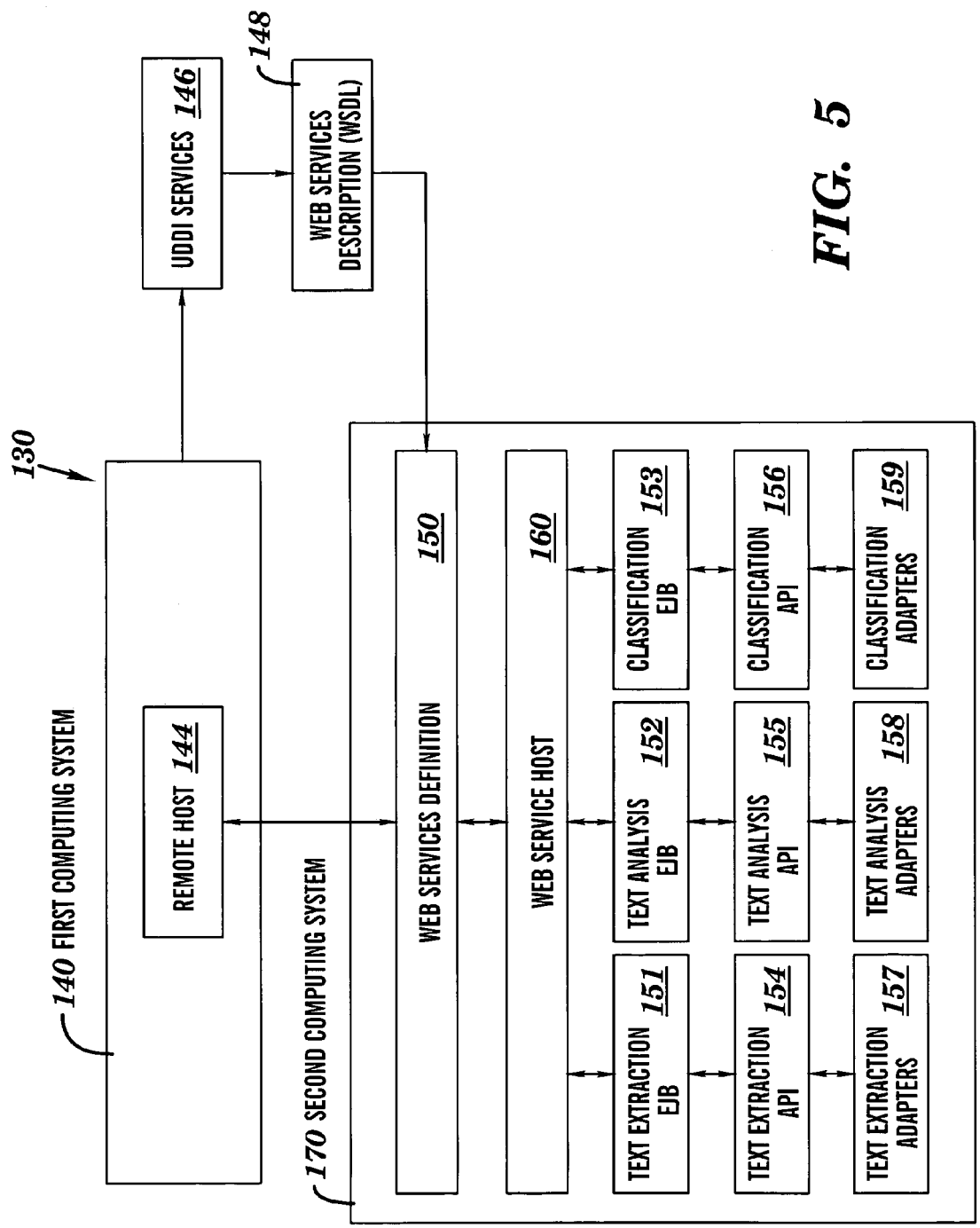
FIG. 5 depicts a system for processing the given document of FIG. 1, wherein the document is divided into chucks before a web service host receives and processes the document by text extraction, text analysis, and classification, in accordance with embodiments of the present invention.

FIG. 5 depicts a system 130 for determining categories and document links relating to the document 10 of FIG. 1, in accordance with embodiments of the present invention. The system 130 comprises a first computing system 140 and a second computing system 170. The first computing system 140 and the second computing system 170 of FIG. 5 are respectively similar in many respects to the first computing system 40 and the second computing system 50 of FIG. 4. The taxonomy rules 60 and the third computing system 70 of FIG. 4 are not shown in FIG. 5 for simplicity, but may nonetheless be present in conjunction with FIG. 5 and have the same role as was described supra in conjunction with FIG. 4.

The first computing system 140 comprises a remote host 144 which is a source of the given document (i.e., the document 10 of FIG. 1) to be processed in accordance with the present invention. In FIG. 5, the remote host 144 is any remote application environment (or remote application) such any commercial word processor environment (e.g., Microsoft Word, WordPerfect, etc.), a web browser, an instant messaging application, etc. The remote host 144 is remote the second computing system 170 and may communicate with the web services host 160 through any transmission means or path such, inter alia, the Internet, an Intranet, telephone lines, cable, etc. The remote host 144 may establish communication with the web services host 160 by establishing a "session", with an associated session identification ("session id"), in accordance with communication protocols.

The remote host 144 is linked to Universal Description, Discovery (UDDI) services 146. The UDDI services 146 enables the remote host 144 to select the web service host 160 of the second computing system 170 for processing the given document as will be described infra.

The second computing system 170 receives and processes the given document from the first computing system 140. The second computing system 170 comprises the web service host 160 which encapsulates, in accordance with the Web Services Definitions 150, three types of services: text extraction, text analysis, and classification. The text extraction relates to step 13 of FIG. 2 and includes a text extraction Enterprise Java Bean (EJB) 151 which wraps a text extraction Application Programming Interface (API) 154 and a text extraction adapter 157 (a text extraction tool). The text extraction receives the document text in a non-text format, extracts the text, and configures the extracted text in a text format. Text extraction is unnecessary if the received document text is in a text format. The text analysis relates to steps 14-16 of FIG. 1 and includes an EJB 152 which wraps a text analysis API 155 and a text analysis adapter 158 (a set of text analysis tools associated with steps 14-16 of FIG. 1). The text analysis generates document keys associated with the text from analysis of the text (in the text format), by generating tokens of the text such that stop words do not appear in the tokens, and stemming the tokens to generate the document keys from the tokens. The classifiers relate to steps 21-23 of FIG. 2 and includes a classification EJB 153 which wraps a classification API 156 and classification adapters 159 which implement steps 21-23 of FIG. 2. The classification determines, from given categories of a document taxonomy, a set of closet categories to the document based on a comparison between document keys and category keys of the given categories as explained supra in conjunction with FIG. 2. In FIG. 5, the classification adapters 159 have access to taxonomy rules 60 (see FIG. 1), described supra. The Web Services Definitions 150 serves as a direct interface with the remote host 144 and allows the remote host 144 to access the text extraction, text analysis, and classification through whatever Remote Procedure Call (RPC) mechanism is defined in the Web Services Definitions 150.

If there is a size limit to the amount of data that can be transferred in one chunk to the web services host 160, the web services host 160 receives the given document from the remote host 144 in a plurality of chunks after the given document has been broken down into said chunks by the remote host 144. Thus, the web services host 160 is capable of receiving said chunks of said document, and of synthesizing said chucks to reconstruct the entire document for subsequent processing (i.e., text extraction, text analysis, and classification). The remote host 144 can break down the given document in any manner such that the web services host 160 is capable of receiving the largest of said chunks. The session id associated with the session between the remote host 144 and the web services host 160 may be used to make sure that the correct document chunk is reconciled with the reconstructed document. After the web services host 160 reconstructs the entire document, the processing (i.e., text extraction, text analysis, classification) of the reconstructed document, and utilization of the document keys resulting therefrom, can be implemented in the manner described supra in conjunction with FIGS. 1-3.

The remote host 144 is linked to Universal Description, Discovery (UDDI) services 146. The UDDI services 146 enables the remote host 144 to select the web service host 160 of the second computing system 170 for processing the given document as will be described next.

The remote application of the remote host 144 may have knowledge of an information processing service that can serve as the web service host 160. If the remote host 144 does not have knowledge of an information processing service that can serve as the web service host 160, then the remote host 144 can determine an appropriate web service to serve as the web service host 160, by utilizing the UDDI services 146 which could be internal to a network or which could alternatively be a public server such as the Extensible Markup Language (XML)-based public registry ("XML-based public UDDI registry") to which over 130 companies (e.g., IBM, Microsoft, etc.) are affiliated. This XML-based public UDDI registry enables businesses worldwide to list themselves on the Internet. Thus XML-based public UDDI registry serves to streamline online transactions by enabling companies to find one another on the Web and make their systems interoperable for e-commerce. UDDI is often compared to a telephone book's white, yellow, and green pages, and allows businesses to list themselves by name, product, location, or the Web services they offer. This XML-based public UDDI registry has a specification which utilizes World Wide Web Consortium (W3C) and Internet Engineering Task Force, and Domain Name System (DNS) protocols, and has also adopted early versions of the proposed Simple Object Access Protocol (SOAP) messaging guidelines for cross platform programming.

The remote host 144 can have a search performed in conjunction with the UDDI services 146 to determine one or more information processing services for the text extraction services, the text analysis services, and the classification services needed from the web service host 150, as well as the service of being able to read a document in two or more chunks, thereby enabling the remote host 144 to select the information processing service that can serve as web service host 160. The search results in a Web Services Description (WSDL) 148 document that describes how to access each information processing service identified in the UDDI search. The remote host 144 can use the WSDL 148 document to connect to the web service host 160 in accordance with the Web Services Definitions 150.

Figure 6:
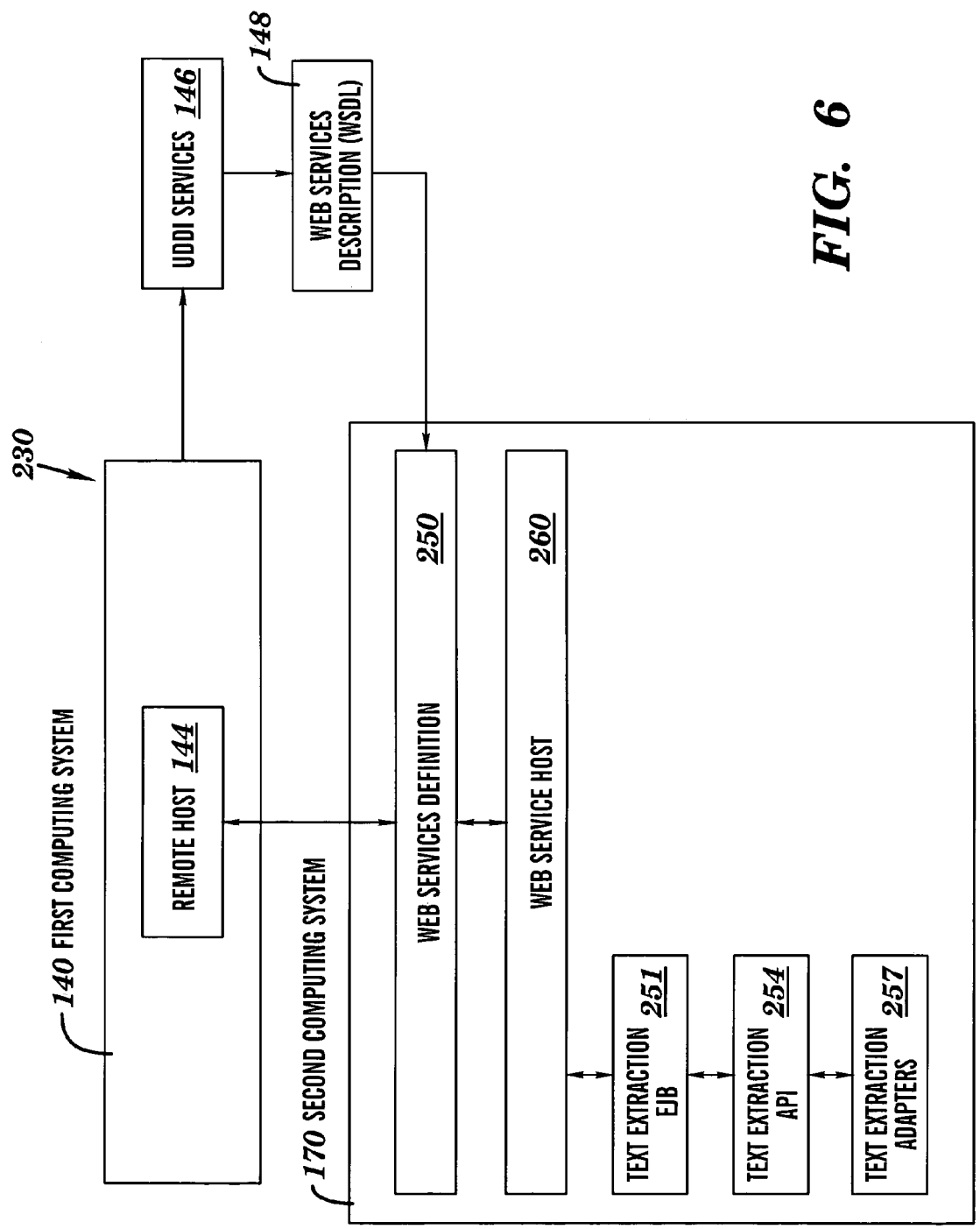
FIG. 6 depicts a variant of the system of FIG. 5 wherein the web service host performs only the text extraction, in accordance with embodiments of the present invention.

FIG. 6 depicts a system 230 which is a variant of the system 130 of FIG. 5, wherein the web service host 260 of FIG. 6 performs only the text extraction, in accordance with embodiments of the present invention. The Web Services Definitions 250 of FIG. 6 is analogous to the Web Services Definitions 150 of FIG. 5. The web service host 260 of FIG. 6 is analogous to the web service host 160 of FIG. 5. The text extraction EJB 251, the text extraction API 254, and the text extraction adapters 257 of FIG. 6 are respectively analogous to the text extraction EJB 151, the text extraction API 154, and the text extraction adapters 157 of FIG. 5. The text analysis and the classification of FIG. 5 are not performed by the web service host 260 of FIG. 6. Thus, the text analysis and/or the classification may be subsequently performed by one or more web service hosts other than the web service host 260, utilizing the text extracted by the web service host 260.

Figure 7:
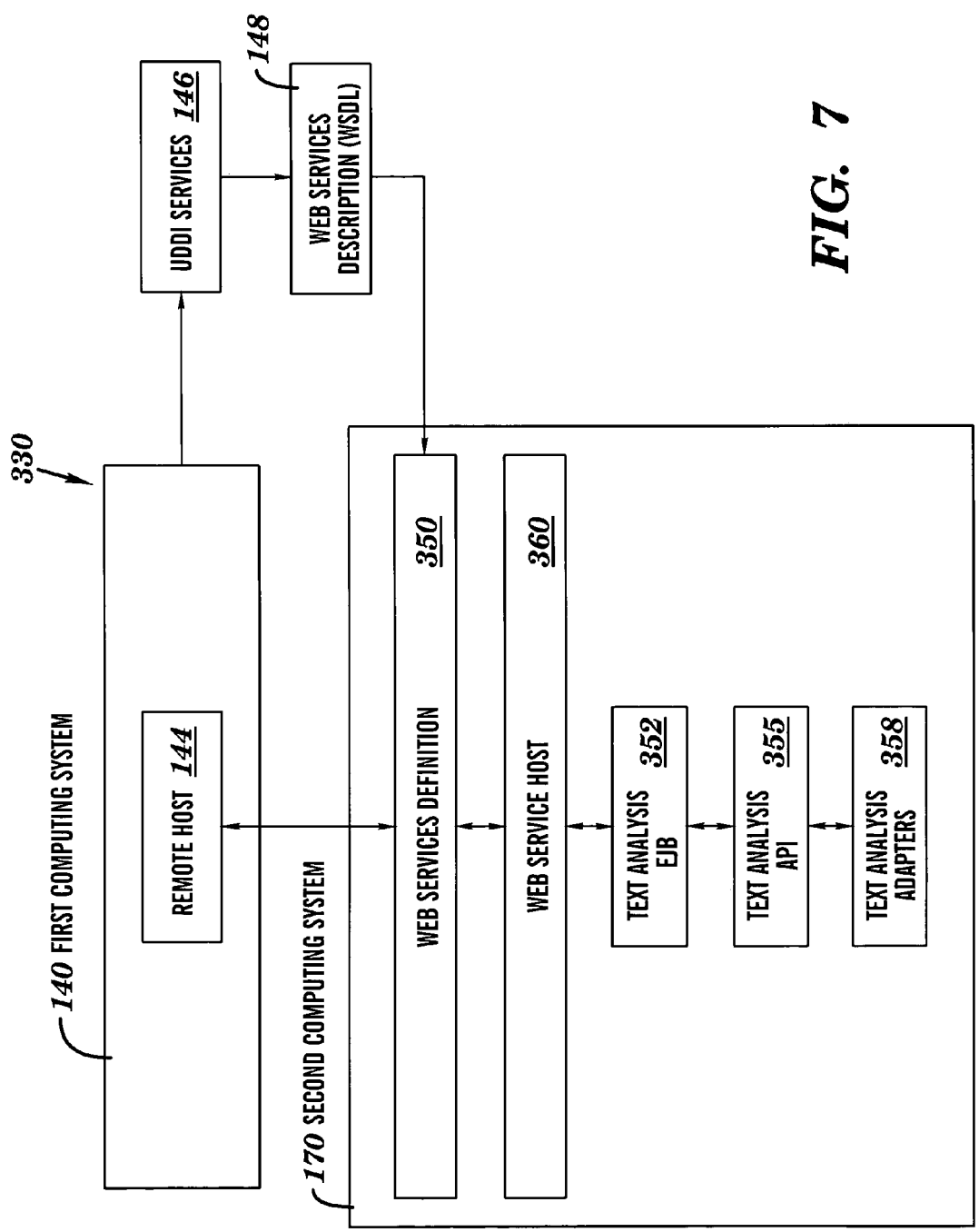
FIG. 7 depicts a variant of the system of FIG. 5 wherein the web service host performs only the text analysis, in accordance with embodiments of the present invention.

FIG. 7 depicts a system 330 which is a variant of the system 130 of FIG. 5, wherein the web service host 360 of FIG. 7 performs only the text analysis, in accordance with embodiments of the present invention. The Web Services Definitions 350 of FIG. 7 is analogous to the Web Services Definitions 150 of FIG. 5. The web service host 360 of FIG. 7 is analogous to the web service host 160 of FIG. 5. The text analysis EJB 352, the text analysis API 355, and the text analysis adapters 358 of FIG. 7 are respectively analogous to the text analysis EJB 152, the text analysis API 155, and the text analysis adapters 158 of FIG. 5. The text extraction and the classification of FIG. 5 are not performed by the web service host 360 of FIG. 7. Thus, the reconstructed document synthesized by the web service host 360 includes text in a text format. Additionally, classification may be subsequently performed by a web service host other than the web service host 360, utilizing the document keys generated by the web service host 360.

Figure 8:
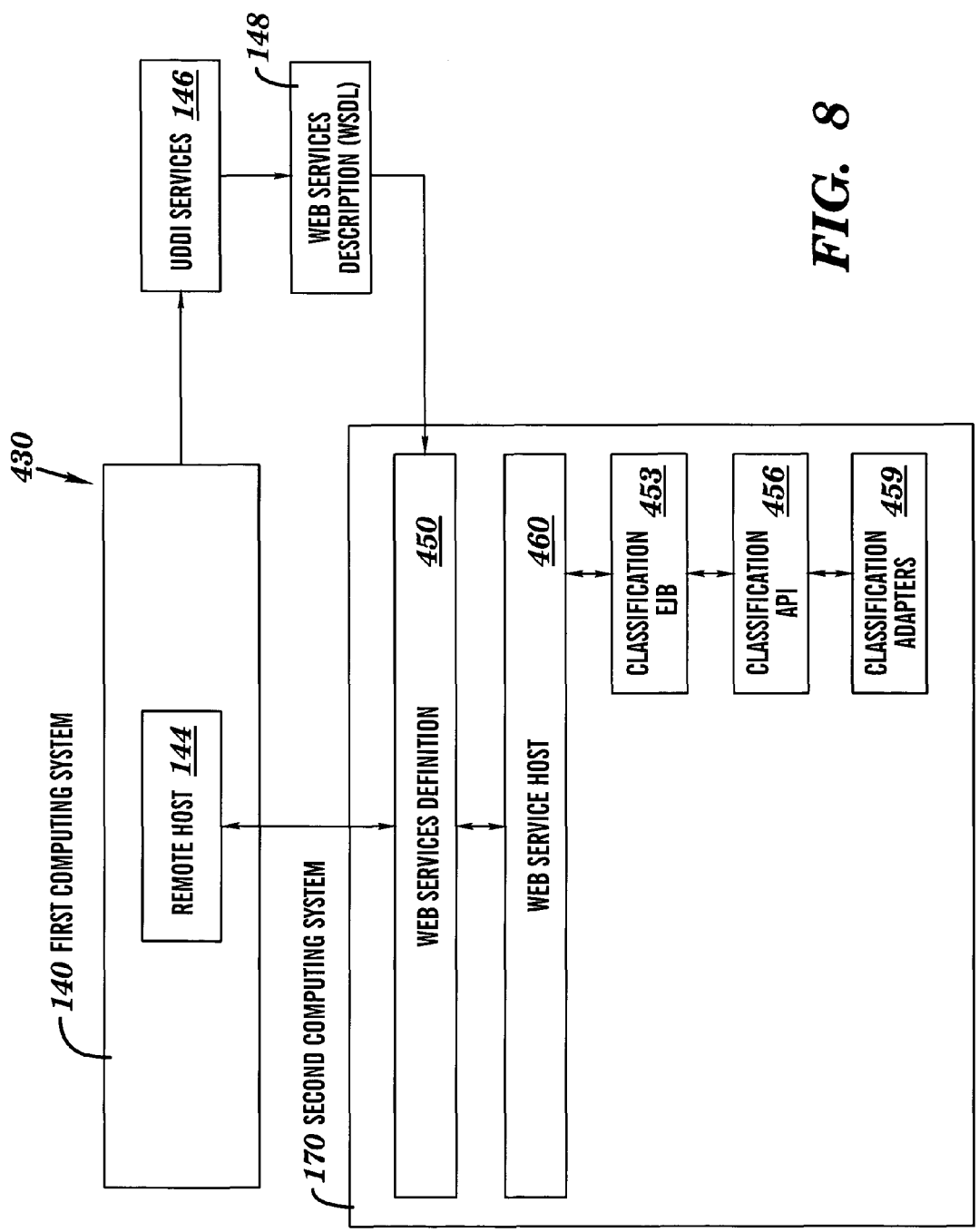
FIG. 8 depicts a variant of the system of FIG. 5 wherein the web service host performs only the classification, in accordance with embodiments of the present invention.

FIG. 8 depicts a system 430 which is a variant of the system 130 of FIG. 5, wherein the web service host 460 of FIG. 8 performs only the classification, in accordance with embodiments of the present invention. The Web Services Definitions 450 of FIG. 8 is analogous to the Web Services Definitions 150 of FIG. 5. The web service host 460 of FIG. 8 is analogous to the web service host 160 of FIG. 5. The classification EJB 453, the classification API 456, and the classification adapters 459 of FIG. 8 are respectively analogous to the classification EJB 153, the classification API 156, and the classification adapters 159 of FIG. 5. The text extraction and the text analysis of FIG. 5 are not performed by the web service host 460 of FIG. 8. Thus, the reconstructed document synthesized by the web service host 460 includes document keys.

Figure 9:
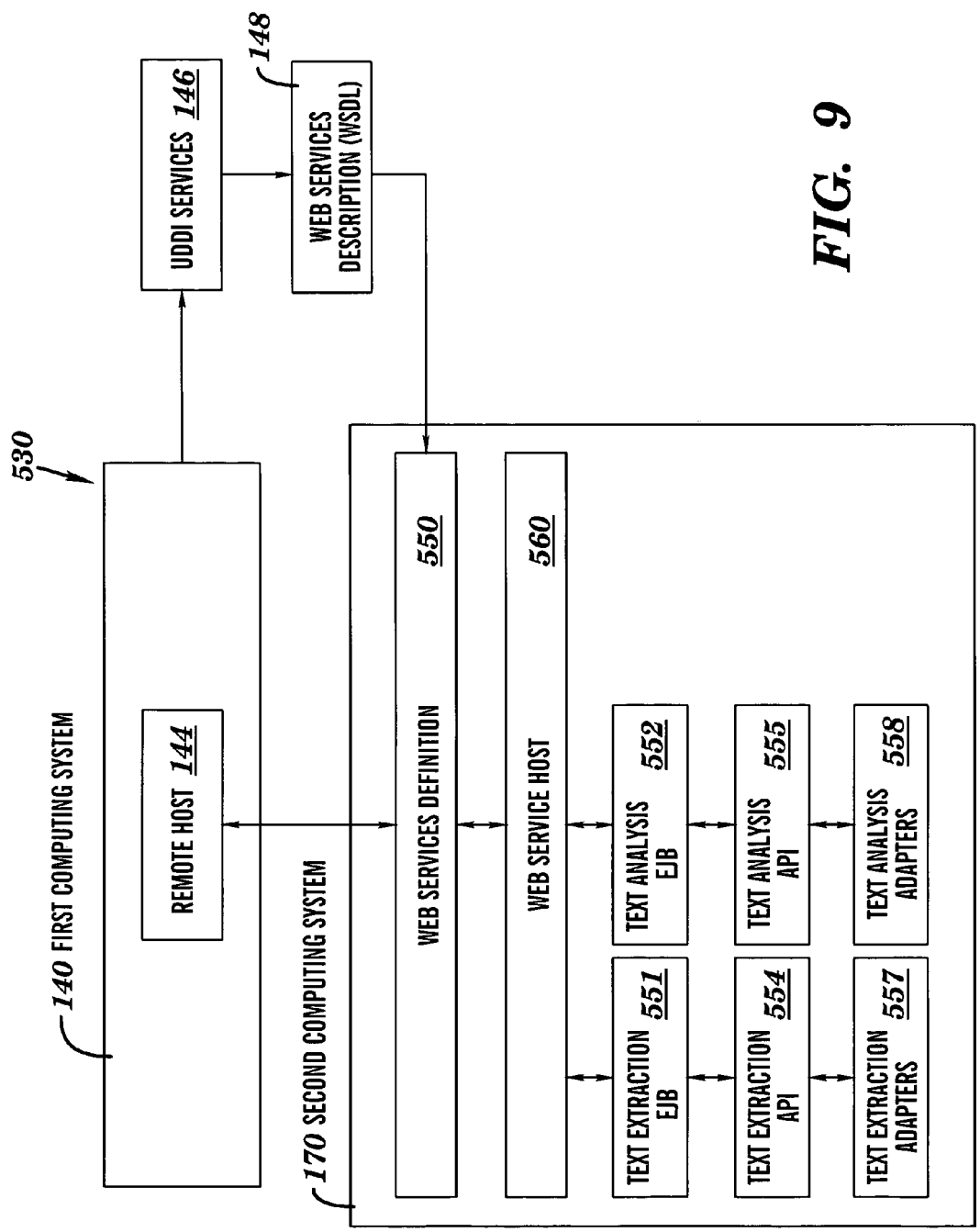
FIG. 9 depicts a variant of the system of FIG. 5 wherein the web service host performs only the text extraction and text analysis, in accordance with embodiments of the present invention.

FIG. 9 depicts a system 530 which is a variant of the system 130 of FIG. 5, wherein the web service host 560 of FIG. 9 performs only the text extraction and the text analysis, in accordance with embodiments of the present invention. The Web Services Definitions 550 of FIG. 9 is analogous to the Web Services Definitions 150 of FIG. 5. The web service host 560 of FIG. 9 is analogous to the web service host 160 of FIG. 5. The text extraction EJB 551, the text extraction API 554, and the text extraction adapters 557 of FIG. 9 are respectively analogous to the text extraction EJB 151, the text extraction API 154, and the text extraction adapters 157 of FIG. 5. The text analysis EJB 552, the text analysis API 555, and the text analysis adapters 558 of FIG. 9 are respectively analogous to the text analysis EJB 152, the text analysis API 155, and the text analysis adapters 158 of FIG. 5. The classification of FIG. 5 is not performed by the web service host 560 of FIG. 9. Additionally, classification may be subsequently performed by a web service host other than the web service host 560, utilizing the document keys generated by the web service host 560.

Figure 10:
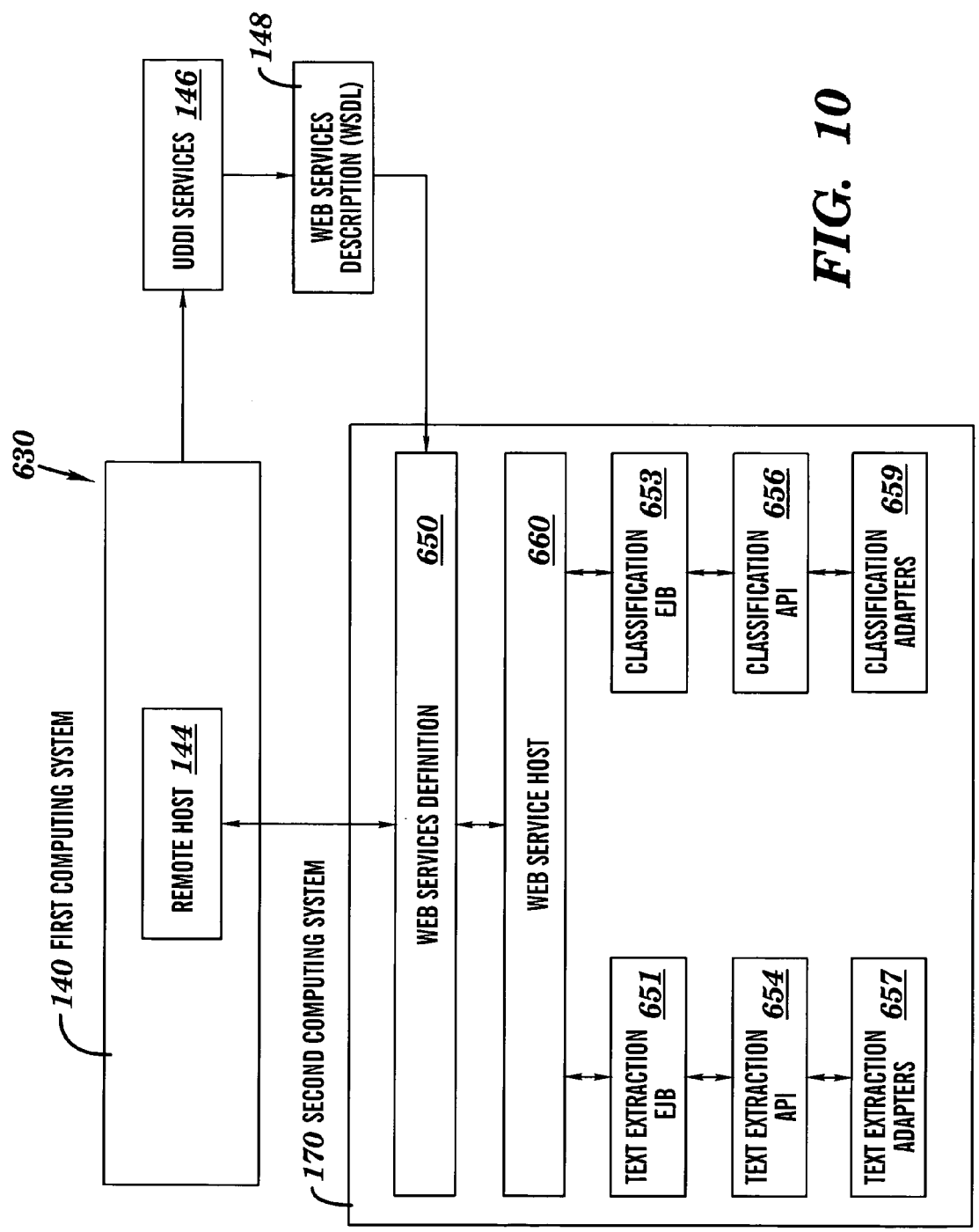
FIG. 10 depicts a variant of the system of FIG. 5 wherein the web service host performs only the text extraction and classification, in accordance with embodiments of the present invention.

FIG. 10 depicts a system 630 which is a variant of the system 130 of FIG. 5, wherein the web service host 660 of FIG. 10 performs only the text extraction and the classification, in accordance with embodiments of the present invention. The Web Services Definitions 650 of FIG. 10 is analogous to the Web Services Definitions 150 of FIG. 5. The web service host 660 of FIG. 10 is analogous to the web service host 160 of FIG. 5. The text extraction EJB 651, the text extraction API 654, and the text extraction adapters 657 of FIG. 10 are respectively analogous to the text extraction EJB 151, the text extraction API 154, and the text extraction adapters 157 of FIG. 5. The classification EJB 653, the classification API 656, and the classification adapters 659 of FIG. 10 are respectively analogous to the classification EJB 153, the classification API 156, and the classification adapters 159 of FIG. 5. The text analysis of FIG. 5 is not performed by the web service host 660 of FIG. 10, but is instead performed by a web service host other than the web service host 660 to generate the document keys, utilizing the text in a text format extracted from the reconstructed document by the web service host 660, and the document keys are subsequently made available to the web service host 660 for performing the classification.

Figure 11:
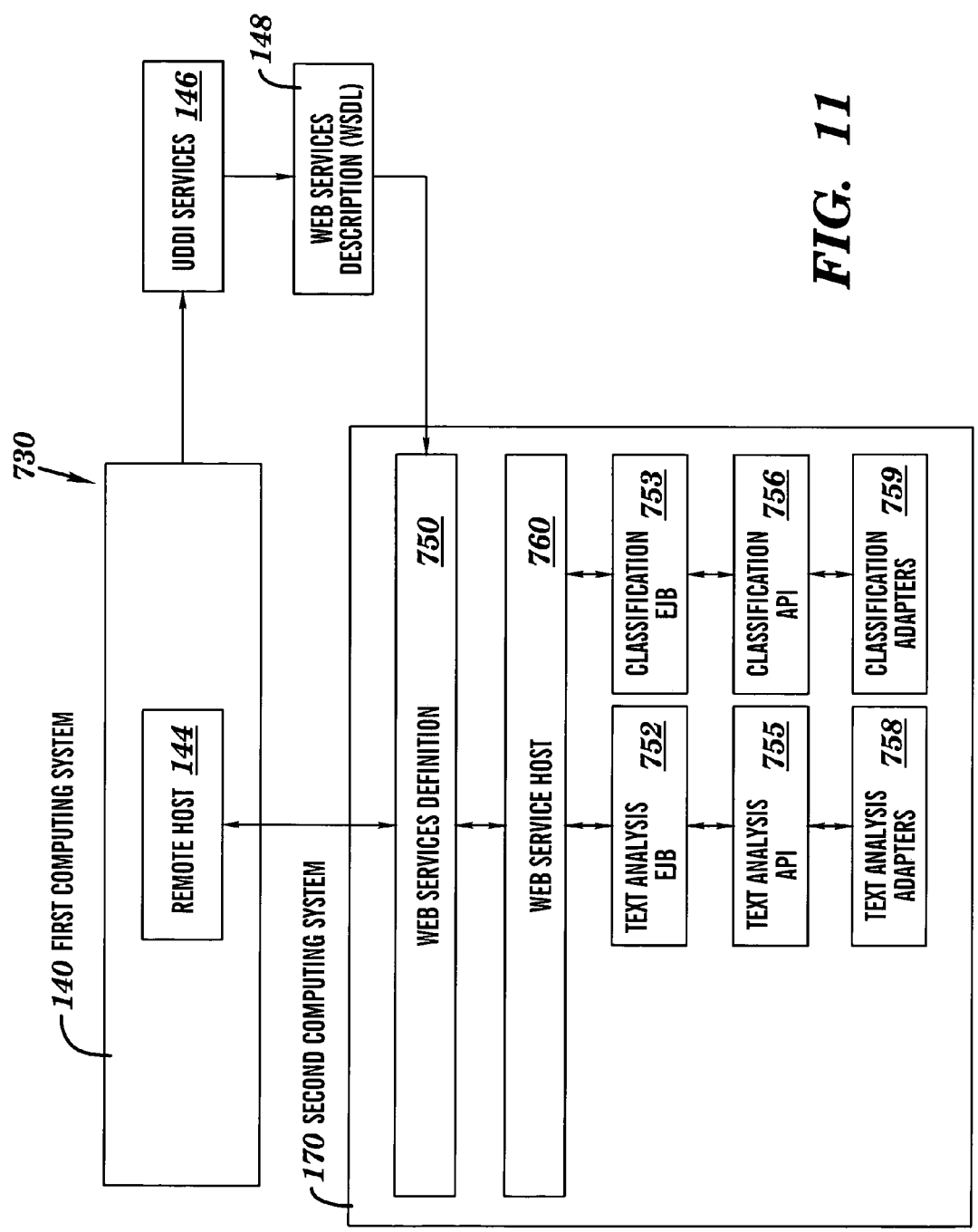
FIG. 11 depicts a variant of the system of FIG. 5 wherein the web service host performs only the text analysis and classification, in accordance with embodiments of the present invention.

FIG. 11 depicts a system 730 which is a variant of the system 130 of FIG. 5, wherein the web service host 760 of FIG. 11 performs only the text analysis and the classification, in accordance with embodiments of the present invention. The Web Services Definitions 750 of FIG. 11 is analogous to the Web Services Definitions 150 of FIG. 5. The web service host 760 of FIG. 11 is analogous to the web service host 160 of FIG. 5. The text analysis EJB 752, the text analysis API 755, and the text analysis adapters 758 of FIG. 11 are respectively analogous to the text analysis EJB 152, the text analysis API 155, and the text extraction adapters 158 of FIG. 5. The classification EJB 753, the classification API 756, and the classification adapters 759 of FIG. 11 are respectively analogous to the classification EJB 153, the classification API 156, and the classification adapters 159 of FIG. 5. The text extraction of FIG. 5 is not performed by the web service host 760 of FIG. 1. Thus, the reconstructed document synthesized by the web service host 760 includes text in a text format.

Figure 12:
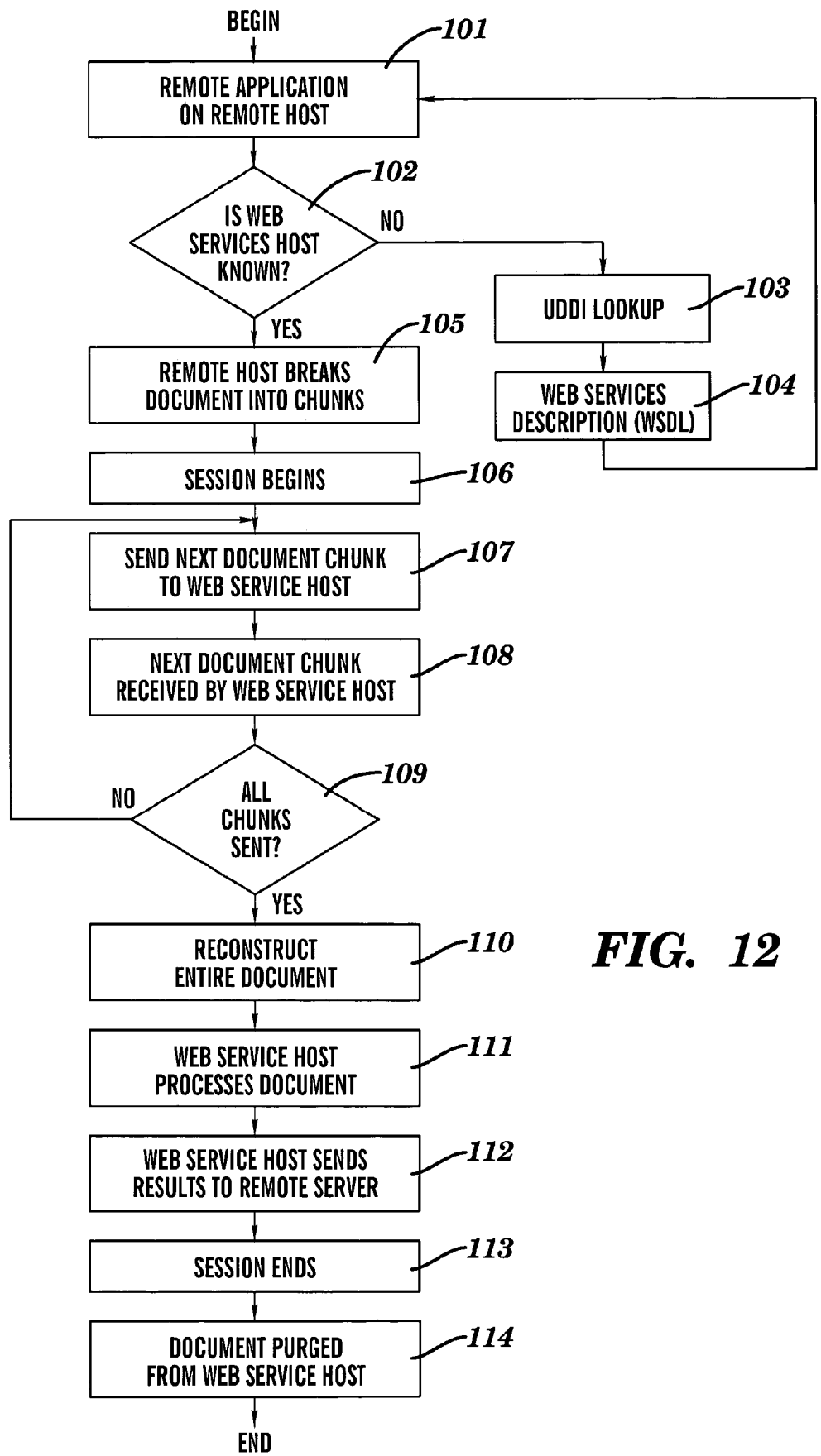
FIG. 12 is a flow chart depicting a determination of the web service host of the systems of FIGS. 5-11 and further depicting breaking the document into chucks and transmission of the chunks to the web service host, in accordance with embodiments of the present invention.

FIG. 12 is a flow chart depicting a determination of the web service host of the systems of FIGS. 5-11 and further depicting breaking a document into chucks and transmission of the chunks to the web service host, in accordance with embodiments of the present invention. Step 101 provides a remote application on a remote host of a first computing system.

Step 102 determines whether the web services host of the second computing system is known to the remote host. If the web services host is known to the remote host, then step 105 is next executed. If the web services host is not known to the remote host, then step 103 implements a UDDI lookup (i.e., UDDI search), as explained supra, to determine one or more web services host for performing at least one of the text extraction services, the text analysis services, and the classification services, and for performing the service of being able to read a document in two or more chunks which enables the remote host to select the web service host. As a result of the UDDI lookup, step 104 provides a Web Services Description (WSDL) document that describes how to access each web services host identified in the UDDI lookup. The remote host can use the WSDL document to connect to the web service host in accordance with the Web Services Definitions as explained supra. Step 105 is next executed.

In step 105, the remote host breaks the document into chunks. In step 106, a session with a session id is established between the remote host and the web services host. In step 107, the next document chunk is sent by the remote host to the web services host, and in step 108 the next document chunk is received by the web services host. In step 109, a determination is made of whether all document chunks have been sent by the remote host to the web services host. If it is determined that all document chunks have been sent by the remote host to the web services host, then step 110 is next executed. If it is determined that all document chunks have not been sent by the remote host to the web services host, then the procedure loops back to step 107 to send another document chunk to the web services host.

In step 110, the web service host reconstructs the entire document from the totality of document chucks received from the remote host. Reconstructing the entire document may, but not necessarily, include storing the document chucks contiguously in a memory medium. Alternatively, the documents could be stored in any fragmented manner so long as the web services host has sufficient information to logically link the chunks together in the proper sequence. For example, each document chunk could include an appended pointer that points to the next sequential document chunk. As another example, the web services host may construct a table of pointers which respectively point to the document chunks, wherein the pointers are arranged in the table in a sequential order that corresponds to the sequential order of the document chunks.

In step 111, the web service hosts processes the reconstructed document, which includes at least one of text extraction, text analysis, and classification as explained supra. In step 112, the web server host sends results back to the remote host. The results may include, inter alia, document keys, classification results, etc. In step 113, the session ends. In step 114, the reconstructed document is purged from the web server host.

Figure 13:
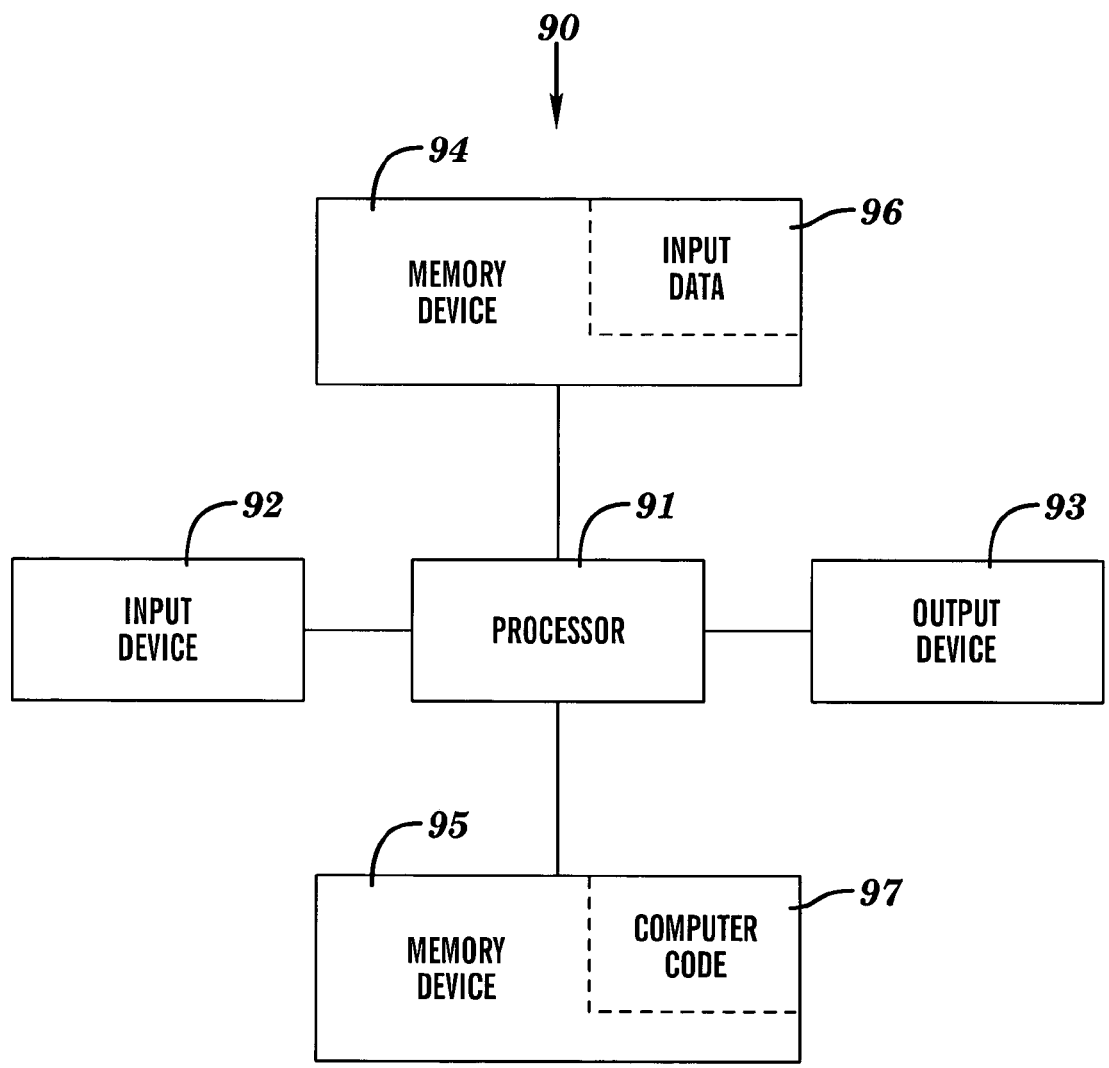
FIG. 13 depicts a computing system for determining categories and document links relating to a given document, in accordance with embodiments of the present invention.

FIG. 13 illustrates a computer system 90 for determining categories and document links relating to a given document, in accordance with embodiments of the present invention. The computer system 90 may represent any of the following computing systems of FIG. 4: the first computing system 40, the second computing system 50, or the third computing system 70. Alternatively, the computer system 90 may represent any of the following computing systems of FIGS. 5-11: the first computing system 140 or the second computing system 170. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97. The computer code 97 comprises at least one algorithm whose functionality depends on which of the first computing system 40, the second computing system 50, and the third computing system 70 is represented by the computer system 90. For example, if the computer system 90 represents the second computing system 50 then the at least one algorithm comprised by the computer code 97 may have the functionality of any or all of the text extraction adapters (55, 157, 257, 557, 657), the text analysis adapters (57, 158, 358, 558, 758), and the classifier adapters (59, 159, 459, 659, 759) of FIGS. 4-11. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may be used as a computer usable medium having a computer readable program code embodied therein, wherein the computer readable program code comprises the computer code 97.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for document analysis and retrieval, comprising the steps of:

accessing a document taxonomy that comprises M categories such that M is at least 2, wherein the document taxonomy is a based on a subject matter classification in conjunction with a collection of stored documents, wherein each category of the M categories has an associated at least one category key, wherein the category keys of all M categories collectively consist of N unique category keys sequentially ordered and denoted as CATKEY, CATKEY, . . . , CATKEY;

transmitting, by a remote host in a first computing system to a web service host in a second computing system, a first portion of a document; and sequentially transmitting, by the remote host to the web service host, at least one additional portion of the document, wherein the first portion and the at least one additional portion collectively comprise the entire document, wherein the entire document is adapted to be reconstructed and subsequently processed via processing said entire document by the web service host, said processing comprising:

extracting text from said entire document to configure said text in a text format, if said entire document received by said web service host comprises said text in a non-text format;

generating a plurality of document keys associated with said text from analysis of said text in said text format, if said entire document received by said web service host comprises said text in said text format, or if said web service host has previously performed said extracting such that said text in said text format is available to said web service host;

generating a document key vector $V_{DOC}$ of order N, wherein said generating $V_{DOC}$ comprises for n=1, 2, ..., N: determining setting $V_{DOC}$ equal to 1 if the plurality of document keys comprises a document key equal to CATKEY, otherwise setting $V_{DOC}$ equal to 0;

after said generating $V_{DOC}$, generating a document weight vector $W_{DOC}$ of order N, wherein said generating $V_{DOC}$ comprises for n=1,2, ..., N: setting $W_{DOC}$ equal to a first frequency count raised to a power $P_1$ greater than 1, wherein the first frequency count consists of a number of appearances, in the document, of the document key associated with $V_{DOC}$ if $V_{DOC}$ is equal to 1 or consists of 0 if $V_{DOC}$ is equal to 0;

for each category m (m=1, 2 ..., M): generating a category vector $V_{CAT}$ (m) of order N, wherein said generating $V_{CAT}(m)$ comprises for n=1, 2 ..., N: setting $V_{CAT}(m)$ equal to 1 if category m has a category key equal to equal to CATKEY, otherwise setting $V_{CAT}(m)$ equal to 0;

after said generating $V_{CAT}(m)$, for each category m (m=1, 2 ..., M): generating a category weight vector $W_{CAT}(m)$ of order N, wherein said generating $W_{CAT}(m)$ comprises for n=1, 2, ..., N: setting $W_{CAT}(m)$ equal to a second frequency count raised to a power $P_2$ greater than 1, wherein the second frequency count consists of a number of appearances, in the collection of stored documents, of the category key associated with $V_{CAT}(m)$ if $V_{CAT}(m)$ is equal to 1 or consists of 0 if $V_{CAT}(m)$ is equal to 0;

computing distances, wherein said computing distances is selected from the group consisting of computing first distances, computing second distances, computing third distances, and computing fourth distances, wherein said computing first distances comprises computing a dot product of $V_{DOC}$ and $V_{CAT}$ (m) for m=1, 2, ..., M, wherein said computing second distances comprises computing a dot product of $V_{DOC}$ and $W_{CAT}$ (m) for m=1, 2, ..., M, wherein said computing third distances comprises computing a dot product of $W_{DOC}$ and $V_{CAT}(m)$ for m=1, 2, ..., M, and wherein said computing fourth distances comprises computing a dot product of $W_{DOC}$ and $W_{CAT}(m)$ for m=1, 2, ..., M;

determining, from said computed distances, a set of closest categories to the document, if said entire document received by said web service host comprises said document keys, or if said web service host has previously performed said generating the plurality of document keys such that said document keys are available to said web service host.

2. The method of claim 1, further comprising prior to the sending step identifying said web services host, said identifying comprising:

executing a Universal Description, Discovery, and Integration (UDDI) search to identify one or more web services hosts who can receive said document in chunks and who can perform said at least one of said extracting, generating, and stemming; and selecting said web services host from said one or more web services hosts.

3. The method of claim 1, wherein said transmitting and sequentially transmitting comprise respectively transmitting and sequentially transmitting the first portion and the at least one additional portion via Internet transmission to said web service host.

4. The method of claim 1, wherein said generating the plurality of document keys comprises:

generating tokens of said text such that stop words do not appear in said tokens; and stemming said tokens to generate said document keys from said tokens.

5. The method of claim 1, wherein said computing distances consists of said computing first distances.

6. The method of claim 1, wherein said computing distances consists of said computing second distances.

7. The method of claim 1, wherein said computing distances consists of said computing third distances.

8. The method of claim 1, computing distances consists of said computing fourth distances.

9. The method of claim 1, wherein said processing comprises said determining but not said extracting and not said generating.

10. A system for document analysis and retrieval, comprising a first computing system that includes a remote host, wherein the remote host is remote relative to a web service host in a second computing system, and wherein the remote host is adapted to perform the method of claim 1.

11. A method for document analysis and retrieval, comprising the steps of:

accessing a document taxonomy that comprises M categories such that M is at least 2, wherein the document taxonomy is a based on a subject matter classification in conjunction with a collection of stored documents, wherein each category of the M categories has an associated at least one category key, wherein the category keys of all M categories collectively consist of N unique category keys sequentially ordered and denoted as CATKEY, CATKEY, ..., CATKEY;

receiving, by a web service host in a second computing system from a remote host in a first computing system, a first portion of a document;

sequentially receiving, by the web service host from the remote host, at least one additional portion of the document, wherein the first portion and the at least one additional portion collectively comprise the entire document;

reconstructing the entire document from the first portion and the at least one additional portion; and processing the entire document by the web service host, wherein said processing comprises:

extracting text from said entire document to configure said text in a text format, if said entire document received by said web service host comprises said text in a non-text format;

generating a plurality of document keys associated with said text from analysis of said text in said text format, if said entire document received by said web service host comprises said text in said text format, or if said web service host has previously performed said extracting such that said text in said text format is available to said web service host;

generating a document key vector $V_{DOC}$ of order N, wherein said generating $V_{DOC}$ comprises for n=1, 2, ..., N: determining setting $V_{DOC}$ equal to 1 if the plurality of document keys comprises a document key equal to CATKEY, otherwise setting $V_{DOC}$ equal to 0;

after said generating $V_{DOC}$, generating a document weight vector $W_{DOC}$ of order N, wherein said generating $V_{DOC}$ comprises for n=1, 2, ..., N: setting $W_{DOC}$ equal to a first frequency count raised to a power $P_1$ greater than 1, wherein the first frequency count consists of a number of appearances. in the document, of the document key associated with $V_{DOC}$ if $V_{DOC}$ is equal to 1 or consists of 0 if $V_{DOC}$ is equal to 0;

for each category m (m=1, 2, ..., M): generating a category vector $V_{CAT}(m)$ of order N, wherein said generating $V_{CAT}(m)$ comprises for n=1, 2, ..., N: setting $V_{CAT}(m)$ equal to 1 if category m has a category key equal to equal to CATKEY otherwise setting $V_{CAT}(m)$ equal to 0;

after said generating $V_{CAT}(m)$, for each category m (m=1, 2 ..., M): generating a category weight vector $W_{CAT}(m)$ of order N, wherein said generating $W_{CAT}(m)$ comprises for n=1, 2 ..., N: setting $W_{CAT}(m)$ equal to a second frequency count raised to a power $P_2$ greater than 1, wherein the second frequency count consists of a number of appearances, in the collection of stored documents, of the category key associated with $V_{CAT}(m)$ if $V_{CAT}(m)$ is equal 1 to or consists of 0 if $V_{CAT}(m)$ is equal to 0;

computing distances, wherein said computing distances is selected from the group consisting of computing first distances, computing second distances, computing third distances, and computing fourth distances, wherein said computing first distances comprises computing a dot product of $V_{DOC}$ and VCAT(m) for m=1, 2, ..., M, wherein said computing second distances comprises computing a dot product of $V_{DOC}$ and $W_{CAT}(m)$ for m=1, 2, ... M, wherein said computing third distances comprises computing a dot product of $W_{DOC}$ and $V_{CAT}(m)$ for m=1, 2, ..., M, and wherein said computing fourth distances comprises computing a dot product of $W_{DOC}$ and $W_{CAT}(m)$ for m=1, 2, ..., M;

determining, from said computed distances, a set of closest categories to the document, if said entire document received by said web service host comprises said document keys, or if said web service host has previously performed said generating the plurality of document keys such that said document keys are available to said web service host.

12. The method of claim 11, wherein the web services host is listed in a Universal Description, Discovery, and Integration (UDDI) registry as being able to receive said document in chunks and being able to perform said at least one of said extracting, generating, and determining.

13. The method of claim 11, wherein said receiving and sequentially receiving steps comprise receiving the first portion and the at least one additional portion via Internet transmission from said remote host.

14. The method of claim 11, wherein said generating the plurality of document keys comprises:
generating tokens of said text such that stop words do not appear in said tokens; and
stemming said tokens to generate said document keys from said tokens.

15. The method of claim 11, wherein said computing distances consists of said computing first distances.

16. The method of claim 11, wherein said computing distances consists of said computing second distances.

17. The method of claim 11, wherein said computing distances consists of said computing third distances.

18. The method of claim 11, wherein said computing distances consists of said computing fourth distances.

19. The method of claim 11, wherein the method further comprises:
creating a search string, said search string comprising a logical function of a subset of said document keys;
submitting said search string to a search engine;
receiving links to related documents from said search engine, said links being based on said search string; and
returning said links to said remote host.

20. A system for document analysis and retrieval, comprising a second computing system that includes a web service host, wherein the web service host is remote relative to a remote host in a first computing system, and wherein the web service host is adapted to perform the method of claim 19.

* * * * *